(12) United States Patent
Bae et al.

(10) Patent No.: US 6,226,645 B1
(45) Date of Patent: May 1, 2001

(54) CONSTRUCTION OF CONCEPTIONAL DRAWINGS UTILIZING HYPER LINK INFORMATION OF WEB DOCUMENT AND INTERNET SEARCHING METHOD THROUGH IT

(75) Inventors: Steve Bae; Ki-Tae Kim, both of Seoul (KR)

(73) Assignee: Soft Camp., Ltd., Seoul (KR)

( * ) Notice: Subject to any disclaimer, the term of this patent is extended or adjusted under 35 U.S.C. 154(b) by 0 days.

(21) Appl. No.: 09/422,800

(22) Filed: Oct. 22, 1999

(30) Foreign Application Priority Data

Oct. 22, 1998 (KR) .................................................. 98-44274

(51) Int. Cl.⁷ ...................................................... G06F 17/30
(52) U.S. Cl. .................................. 707/10; 707/3; 707/104; 707/513; 709/217; 709/218
(58) Field of Search .................................. 707/10, 104, 3, 707/513; 709/217, 218

(56) References Cited

U.S. PATENT DOCUMENTS

| | | | |
|---|---|---|---|
| 5,303,379 | * | 4/1994 | Khoyi et al. ........................ 395/700 |
| 5,572,643 | * | 11/1996 | Judson ................................ 395/793 |
| 5,737,619 | * | 4/1998 | Judson ................................ 395/761 |
| 5,802,530 | * | 9/1998 | Van Hoff ............................. 707/513 |
| 5,826,267 | * | 10/1998 | McMillan ................................ 707/9 |
| 5,835,905 | * | 11/1998 | Pirolli et al. .......................... 707/3 |
| 5,838,458 | * | 11/1998 | Tsai ................................... 358/402 |
| 5,848,410 | * | 12/1998 | Walls et al. ............................ 707/4 |
| 5,877,766 | * | 3/1999 | Bates et al. .......................... 345/357 |
| 5,892,908 | * | 4/1999 | Hughes et al. ..................... 395/200.8 |
| 5,893,091 | * | 4/1999 | Hunt et al. ............................ 707/3 |
| 5,895,462 | * | 4/1999 | Toki ................................... 707/3 |
| 5,987,454 | * | 11/1999 | Hobbs ................................... 707/4 |
| 5,999,664 | * | 12/1999 | Mahoney et al. .................... 382/305 |
| 6,016,494 | * | 1/2000 | Isensee et al. ....................... 707/102 |

* cited by examiner

*Primary Examiner*—Thomas Black
*Assistant Examiner*—Frantz Coby

(57) ABSTRACT

This invention relates to an Internet searching method, and which is characterized to be proceeded by:

a hyper link information searching process for visiting the linked web documents and storing by searching a keyword contained in the web document and contents related to the keyword;

an index constructing process for constructing an index by making the keyword of searched hyper link and contents related to the keywords to be data base; and a keyword handling process which searches a keyword connected by hyper link to the inputted keyword when the keyword is inputted, and outputting to one portion of screen by constructing a predetermined conceptional drawing in accordance with connecting strength between each other of searched keywords, and outputting data picture screen indicating address and content for keyword in order to be able to see detailed content of the keywords consisting of conceptional drawing to remaining portion, and which provides an Internet searching method utilizing hyper link information of web document which is made to be able to more correctly and speedily search the information a user wants to find, by providing by searching a keyword described in web document and considering hyper link connection between searched keywords and constructing a conceptional drawing made by keywords related to searched word inputted by a user.

5 Claims, 4 Drawing Sheets

Connecting strength(hyper link times)

CONSTRUCTION OF CONCEPTIONAL DRAWINGS UTILIZING HYPER LINK INFORMATION OF WEB DOCUMENT AND INTERNET SEARCHING METHOD THROUGH IT

BACKGROUND OF THE INVENTION

The present invention relates to an Internet searching method, and an more particularly to a construction in conceptional drawings utilizing hyper link information of web document and Internet-based method of searching method through it, which more correctly and speedily searches for information a user wants to find, by providing by searching keyword described in web document and considering hyper link connection between searched keywords and constructing a conceptional drawings made of keywords connected to searched words inputted by user.

A huge amount of information, some would say a sea of information, is scattered throughout Internet. Many peoples obtain various information through the Internet.

Web documents (home pages) made by respective individuals or groups are connected to each other and represent much of the information on the Internet. Users obtain information through the mutually connected web documents.

The web document consists of hyper text. The hyper text has a characteristic which makes to be able to search other data related to certain words or phrases formatted as keywords (brightly indicated or colored or underlined letters or images) displayed among contents of a document presently being searched and viewed on screen. One simply uses a mouse to click on a keyword for which more information is desired. Such a connection to another document is referred to as a hyper link.

That is, the web documents having keywords related each other are hyper linked to each other.

For a user to search for information through the Internet, a separate searching system for finding information related to the searching word inputted by a user should be utilized. Examples of such information searching methods being used at present are a keyword searching method, a hierarchical directory searching method, and a Meta searching method and the like are used.

The keyword searching method is classifies by indexing the web document according to keywords it contains when the corresponding system collects the web documents (home pages) scattered on Internet.

At this moment, when a user inputs a word to be searched, the searching system finds a web document containing the searched word and shows the document to a user. This keyword searching method is very useful for finding the document containing a particular word (searching word). But in the case when the web documents contained with corresponding searching word are many, there has been a problem that much time is required to find out the desired information, and there has also been a problem that a case of duplicate meaning word or same meaning word for the searching word could not be searched and a quantity of informations to be stored to data base becomes too much.

The hierarchical directory searching method is a method which is classified in response to theme of web document directly by a man which is not an indexing of simple keyword, and which has an advantage capable of easily finding out the information intended to find by a user by decreasing an extent from big theme to small theme, however the hierarchical searching method has a problem that a huge man power is required for collecting, classifying and explaining the linked web documents by themes.

The Meta searching method is a method which inquires the information by using a several numbers of searching system in order to find out the information required by a user because a quantity of informations included by one searching system is limited, and shows to one by synthesizing the searched result.

This Meta searching method has got rid of cumbersome for visiting several numbers of searching system, but it has a problem which could not show all of the actually searched results.

OBJECT AND SUMMARY OF THE INVENTION

Therefore, in order to solve such problems as above, it is an object of the present invention to provide a construction of conceptional drawings utilizing hyper link information of web document and Internet searching method through it, which is made to be able to more correctly and speedily search the information a user wants to find, by providing by searching a keyword described in web document and considering hyper link connection between searched keywords and constructing a conceptional drawing made by keywords related to searched word inputted by a user.

In order to accomplish above object, a feature of the present invention is characterized to be proceeded by:

a hyper link information searching process for visiting the linked web documents and storing by searching a keyword contained in the web document and contents related to the keyword;

an index constructing process for constructing an index by making the keyword of searched hyper link and contents related to the keywords to be data base; and a keyword handling process which searches a keyword connected by hyper link to the inputted keyword when the keyword is inputted, and outputs to one portion of screen by constructing a predetermined conceptional drawing in accordance with connecting strength between each other of searched keywords, and outputs data picture screen indicating address and content for keyword in order to be able to see detailed content of the keywords consisting of conceptional drawing to remaining portion.

The conceptional drawings are constructed in accordance with the connecting strength of keywords related to the keyword around the keyword, and which is characterized to construct a conceptional drawing by extracting the keywords in which the connecting strength is more than threshold value.

DETAILED DESCRIPTION OF THE INVENTION

Hereinafter, preferred embodiments of the present invention will be described more in detail with reference to the accompanying drawings from FIG. 1 to FIG. 6.

Figure 1:
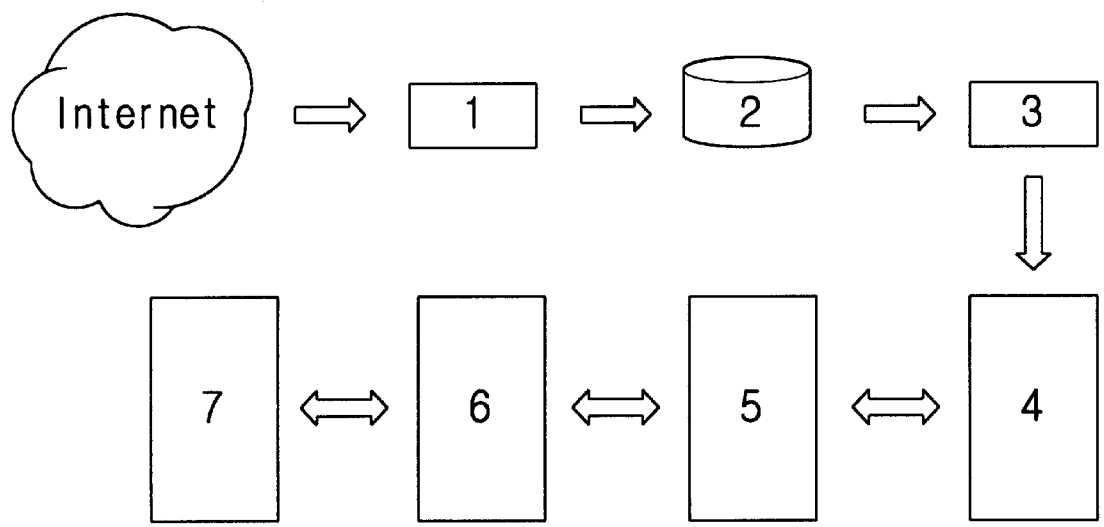
FIG. 1 is a block diagram showing hardware construction for embodying an Internet searching method of the present invention.
Figure 2:
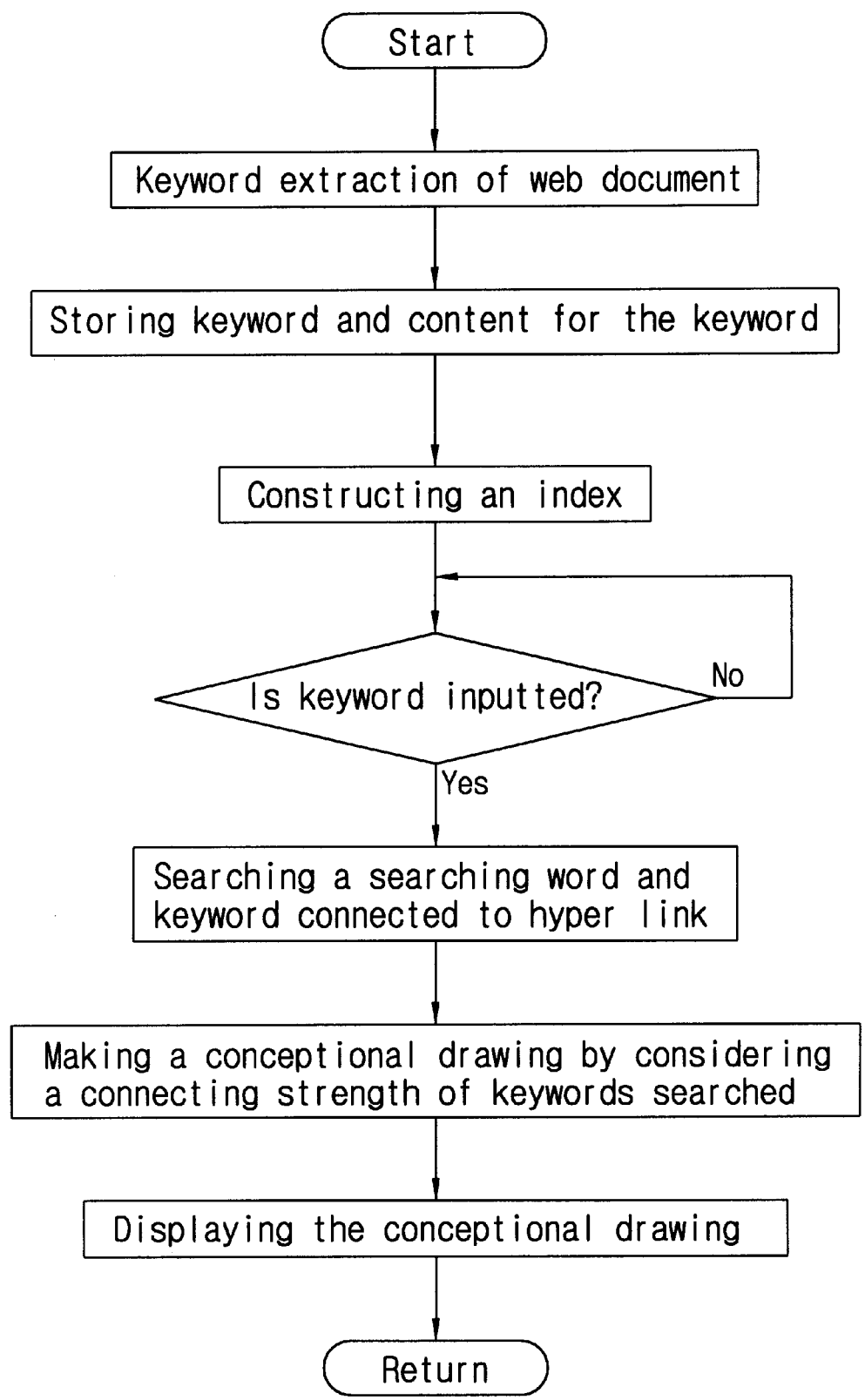
FIG. 2 is a flow chart showing an operating process of Internet searching method of the present invention.

FIG. 1 is a block diagram showing a hardware construction for embodying an Internet searching method of the present invention, and which comprises : a keyword searching means 1 for searching a keyword contained within web document from the web documents scattered in Internet and content of the keyword, a first memory 2 for storing a searched information from the keyword searching means 1, an indexer 3 for constructing an index by making the keyword stored to the first memory 2 and the contents related to the keywords to be data base, a second memory 4 for storing the indexed information, a searching word handling means 5 which searches a searching word stored to the second memory 4 upon inputting the searching word as well as keywords connected to hyper link, and constructing a predetermined conceptional drawing in accordance with hyper link connecting strength between each other of searched keywords, and a web server 6 which communicates with user system 7 and providing a conceptional drawing handled at the searching word handling means 5 to the user system 7.

When explaining an Internet searching method of the present invention realized by the searching system constructed as these, it will be as follows.

HYPER LINK INFORMATION SEARCHING PROCESS

The hyper link information searching process is a process for storing by searching the keywords contained within respective web document from the web documents scattered in Internet, and the keyword searching means 1 visits the web documents and searches the keyword contained within the web document, and stores a content of the keyword to the first memory 2.

INDEX CONSTRUCTING PROCESS

The index constructing process is to classify the searched keyword and the content related to the keyword by word, and its operation is realized by the indexer 3.

That is, the indexer 3 extracts the keywords contained to the first memory 2 and the content related to the keyword by word and classifies by word of keyword, and makes the classified information to be data base and stores to the second memory 4.

SEARCHING WORD HANDLING PROCESS

The searching word handling process is a process which searches the searching word inputted by a user and searches the keywords, and which provides to a user by constructing a predetermined conceptional drawing in accordance with the hyper link strength of searched keywords.

That is, when a user inputs a predetermined searching word in order to obtain an information on the Internet by utilizing the user system 7, the web server 6 transmits the inputted searching word to the searching means 5 whereby demands the conceptional drawing related to the inputted searching word.

The searching word handling means 5 inputted with the searching word from the web server 6 searches the keyword which is identical with the searching word or containing the searching word among the keywords stored in the second memory 4, and searches other keywords connected to the hyper link from the searched keyword, and repeats these keyword searching operation and widens the searching area for the searching word.

Figure 5:
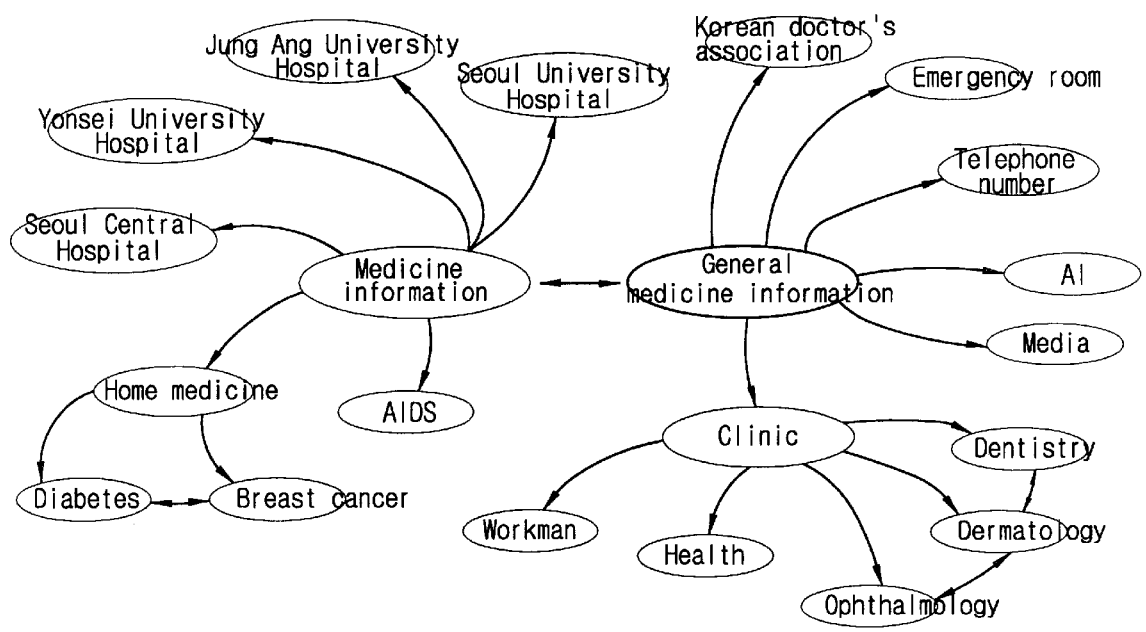
FIG. 5 is a view showing conceptional drawing displayed by the present invention.

And, a conceptional drawing as FIG. 5 is constructed by considering the connecting strength of the searched keywords whereby it is fed to user system 7 through the web server 6, and at this moment, the conceptional drawing as FIG. 5 is outputted to screen top end of the user system 7, and data screen indicating Internet address and content of keywords consisting of conceptional drawing is outputted to the screen bottom end, and not only the user can obtain an information related to searching word inputted by himself or herself but also he or she can be promptly provided with detailed content of keyword shown at conceptional drawing through the data screen indicated at screen bottom.

At a time of constructing the conceptional drawing, the searching word handling means 5 constructs the conceptional drawing in accordance with connecting strength among each other of searched keywords for the searched word, and at this time, the conceptional drawing is constructed by keywords in which a predetermined threshold value is set and a connecting strength exceeds the threshold value.

Figure 3:
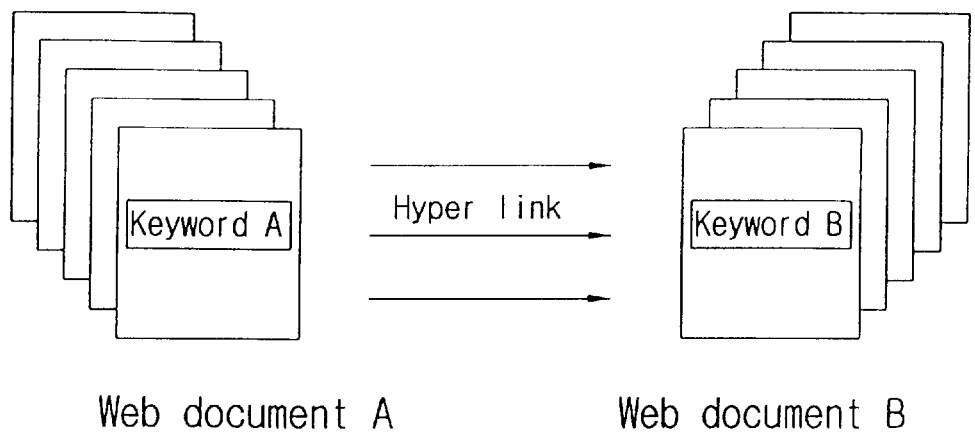
FIG. 3 is a view for explaining a connecting strength among keywords, FIGS. 4a)–4c) are views showing a mutual relation among keywords.

The connecting strength shows number of times connected by hyper link among the keywords, for instance, as shown in FIG. 3, when assuming three (3) hyper link connections are present between keyword A and keyword B, among web document A including keyword A and web document B including keyword B, the connecting strength between keyword A and keyword B becomes to '3'.

Accordingly, that of which the connecting strength is high among keywords (hyper link connecting times are many) means that the connecting strength among keywords is high.

Figure 4A:
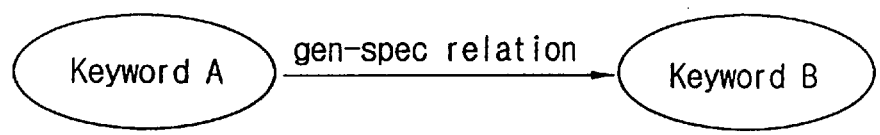
Figure 4B:
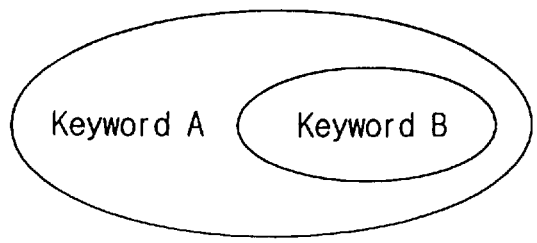

On the other hand, a conceptive relation on the conceptional drawing can be divided into gen-spec relation and equality relation, and the gen-spec relation means a state that hyper link from keyword A to keyword B is connected as FIG. 4a, and this state shows a state that keyword A includes keyword B as FIG. 4b, i.e., the keyword A is a superior conception of keyword B or a general conception.

Figure 4C:
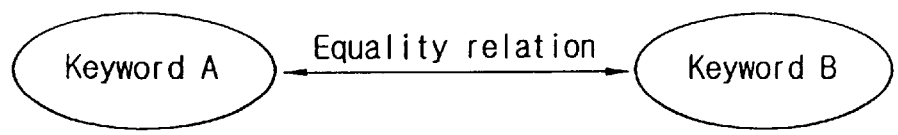

And, the equality conception means a state that hyper link is connected so as to alternate each other between keyword A and keyword B as FIG. 4c, and this state shows a state that keyword A and keyword B are same meaning word, duplicate meaning word, or opposite meaning word one another.

FIG. 5 shows a conceptional drawing constructed by Internet searching method of the present invention when a user inputted a searching word as 'medical information', the keyword such as Seoul University Hospital, Central University Hospital, Yonsei University Hospital, Seoul Central Hospital, Home medicine, Aids which are connected by hyper link to 'medical information' is connected and shown by arrow, and the keyword such as diabetes, breast cancer connected via hyper link to 'home medicine' is connected and shown by arrow.

And, 'general medical information' being in relation of the 'medical information' is connected and shown by bidirectional arrow, and a keyword such as Korean Medical Society, emergency room, telephone number, clinic, AI, MEDIA which is in relation of gen-spec with above 'general medical information' is connected and shown by arrow, and a keyword such as workman, health, ophthalmology, dermatology, dentistry being in relation of another gen-spec with above keyword 'clinic' is connected and shown by arrow.

According to this, a user who inputted a searching word as 'medical information' in order to obtain an information related to various diseases or hospitals can be obviously provided with informations connected via hyper link to keyword as 'medical information', particularly having some degree of connecting strength through the conceptional drawing as FIG. 5, and when an information required by himself or herself among keywords shown in conceptional drawing, e.g., diabetes is clicked by a mouse, another conceptional drawing connected via hyper link to diabetes becomes to be shown on screen.

As described above, when a conceptional drawing is shown on picture screen, as previously described, since address and detailed content of keyword shown in conceptional drawing is outputted to data screen of its bottom, the user can more promptly obtain desired information.

Figure 6:
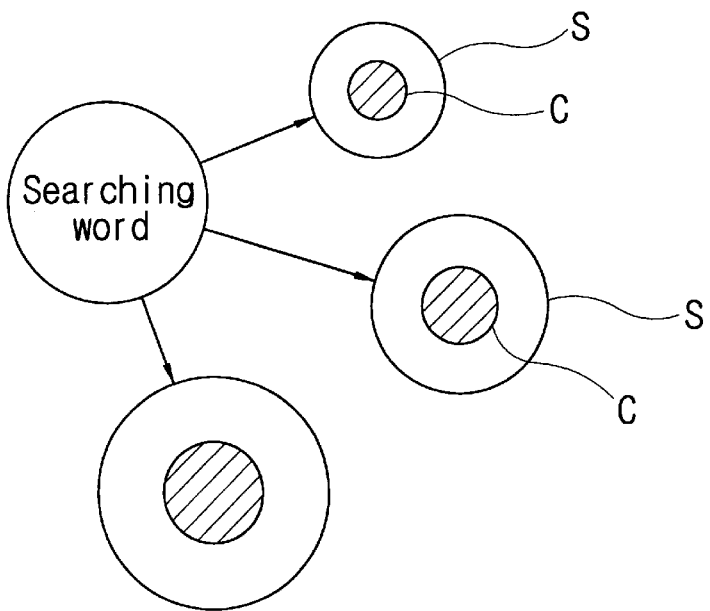
FIG. 6 is a view showing another embodiment of the present invention.

On the other hand, FIG. 6 shows another embodiment of the present invention, and which is shown by one cell depicted by outer circle S showing entire frequency number and inner circle C showing hyper link connecting strength in expressing the searching word and other keyword connected via hyper link when constructing the conceptional drawing, but the hyper link connecting strength to the searching word as magnitude of outer circle S and inner circle C is shown.

As described above, the present invention is a construction of conception utilizing hyper link information of web document and an Internet searching method through it, which searches keyword described in web document, and considers hyper link connecting relation among searched keywords and provides by constructing a conceptional drawing made of keywords related to searching word inputted by user, so that an information wanted to be found by user can be more promptly and correctly searched.

What is claimed is:

1. A method for obtaining desired information based on an inputted searching word and keywords in web documents, comprising:

searching hyperlinked information by keyword, including:
      searching web documents for keywords which are linked by hyperlinks to other web documents, and
      storing each keyword and a hyperlink content associated with each keyword;
   constructing an index among stored keywords, including:
      extracting the stored keywords and associated content,
      classifying the extracted keywords and content using the keywords, and
      storing the classified keywords in a database indexed by keyword; and
   conducting a keyword search and returning results, including:
      detecting a keyword corresponding to the inputted searched word by searching the database,
      identifying keywords of other web documents linked by hyperlinks with the detected keyword,
      arranging the identified keywords around the detected keyword according to a linking strength among the detected keyword and the identified keywords, the arrangement constituting a conceptional drawing with keywords linked by lines, and
      displaying the conceptional drawing.

2. A method as in claim 1, wherein in said storing each keyword step, when keywords in a plurality of web documents are linked by hyperlinks to a common web document, the keywords in the plurality of web documents are stored.

3. A method as in claim 1, wherein in the conceptional drawing, each displayed keyword is associated with an inner and outer concentric circle.

4. A method as in claim 3, wherein the linking strength among the detected keyword and the identified keywords is indicated by a radius of the internal circle of each displayed keyword.

5. A method as in claim 3, wherein the step of searching hyperlinked information further includes:

storing a number corresponding to a frequency of appearance of each keyword in all of the web documents searched, and
   wherein the number corresponding to the frequency of appearance of each keyword is indicated by a radius of the external circle of each displayed keyword.

* * * * *